US011669065B2

(12) United States Patent
Foose et al.

(10) Patent No.: US 11,669,065 B2
(45) Date of Patent: Jun. 6, 2023

(54) DIGITAL INPUT EDGE DETECTION WITH SMART FILTERING ALGORITHM

(71) Applicant: Honeywell International Inc., Morris Plains, NJ (US)

(72) Inventors: Alan R Foose, King of Prussia, PA (US); Aad Van Wensen, Tilburg (NL); Quang Nguyen, Philadelphia, PA (US)

(73) Assignee: Honeywell International Inc., Charlotte, NC (US)

(*) Notice: Subject to any disclaimer, the term of this patent is extended or adjusted under 35 U.S.C. 154(b) by 318 days.

(21) Appl. No.: 16/888,753

(22) Filed: May 31, 2020

(65) Prior Publication Data

US 2020/0387128 A1 Dec. 10, 2020

Related U.S. Application Data

(60) Provisional application No. 62/859,142, filed on Jun. 9, 2019.

(51) Int. Cl.
   *G05B 19/042* (2006.01)
(52) U.S. Cl.
   CPC ........... *G05B 19/0425* (2013.01); *G05B 2219/14004* (2013.01); *G05B 2219/14006* (2013.01); *G05B 2219/14055* (2013.01); *G05B 2219/14067* (2013.01)
(58) Field of Classification Search
   USPC ........................................................ 700/79
   See application file for complete search history.

(56) References Cited

U.S. PATENT DOCUMENTS

| | | | | |
|---|---|---|---|---|
| 4,366,544 | A | * | 12/1982 | Shima ................ G01H 1/003 702/56 |
| 5,426,774 | A | | 6/1995 | Banerjee et al. |
| 7,096,390 | B2 | * | 8/2006 | Talcott ............... G06F 11/3466 714/45 |
| 7,103,610 | B2 | | 9/2006 | Johnson et al. |
| 8,429,654 | B2 | | 4/2013 | Zhao et al. |
| 8,572,404 | B2 | | 10/2013 | Markham et al. |
| 8,594,944 | B2 | | 11/2013 | Piper et al. |
| 2004/0260493 | A1 | | 12/2004 | Richmond |
| 2006/0064182 | A1 | * | 3/2006 | Ford ................. G05B 23/0281 700/79 |
| 2008/0167842 | A1 | | 7/2008 | Cochran et al. |

(Continued)

FOREIGN PATENT DOCUMENTS

EP    1351150 A2    10/2003

OTHER PUBLICATIONS

European search Report for corresponding EP Application No. 20178847.8.

*Primary Examiner* — Md Azad
(74) *Attorney, Agent, or Firm* — Paschall & Associates, LLC; Mark Goldberg

(57) ABSTRACT

A method is provided that provides data analysis for sequence of events reporting in the operation of an industrial process. A digital filter and edge detector are provided that combines a method for excluding known invalid samples and a method for excluding samples taken while the input in the traveling range. The filtering method reduces the overhead on the CPU from managing the sequence of events machine and allows it to focus on performing safety functions.

11 Claims, 3 Drawing Sheets

(56) References Cited

U.S. PATENT DOCUMENTS

2009/0055457 A1\* 2/2009 Miller .................... G05B 15/02
708/300
2009/0063072 A1 3/2009 Sullivan et al.
2011/0313580 A1\* 12/2011 Bakhmach ............... G05B 9/03
700/79
2017/0147427 A1 5/2017 Nero \* cited by examiner

DIGITAL INPUT EDGE DETECTION WITH SMART FILTERING ALGORITHM

This application claims priority from provisional application 62/859,142 filed Jun. 9, 2019.

TECHNICAL FIELD

Embodiments of the invention are generally related to data-processing and root cause analysis. Embodiments are also related to the identification of systemic failures and root causes of incidents in a work environment in which a digital filter and edge detector are used to designate events related to incidents occurring during operations.

BACKGROUND OF THE INVENTION

Work environments such as, for example, process control, nuclear power, health care, military, and manufacturing generally lack a shared understanding of systemic failures and causes related to incidents. An "incident" in these examples may be an "actual loss" event that may be investigated so that effective action can be taken to prevent the same or similar losses from again occurring. A "near miss" event or an upset condition can also be considered an "incident". In this case, no actual loss may have occurred, but the potential for a loss may have been present. A "near miss" may be considered an occurrence in which "actual loss" (e.g., property damage, environmental impact, or human loss) or an operational interruption could have plausibly resulted if circumstances had been slightly different. Such events can thus be considered "incidents," "process upsets," or "system upsets", wherein such a "system" includes human components and machine portions of a system in a work environment.

Incidents may result from the failure of field devices such as, for example, instrumentation, control valves, and pumps or from some form of process disturbance that causes operations to deviate from a normal operating state. Incidents also occur due to human factor and related failures such as human error or problems with current management systems (e.g., training, work processes, procedures, communications, supervision, etc). Incidents may also be caused by unexpected external causes. Early detection of such failures, whether they are operations practice failures, equipment failures, or management systems problems enables an operation team to improve current practices to prevent incidents from occurring in the future or supporting a more effective response when problems occur. An abnormal situation can evolve from an operating upset that could potentially become a catastrophic event involving serious destruction and harm to the plant and the surrounding community. Continuous learning from incidents and understanding systemic failures is a key to developing effective corrective actions with long-term benefit. Safety management systems can detect and record events that indicate deviations from normal process operation. Some examples of such events include a change of state of a valve limit switch, steam pressure exceeding limits, maintenance overrides or forcing points, faults in the field or faults in the safety manager input/output interfaces. Safety management systems will typically have a scan time for sequence of events that is equal to the application cycle time and for low latency sequence of events management the scan time can be set to 1 milliseconds (ms). Each changed process quantity is an event that is recorded in an event buffer that resides within the system. A sequence of events function records events if an event occurred for a point which applies to both process point and system points. Or a force is applied or removed on a point. An event record contains some identification of the sequence of events, such as by a particular point in time or other unique designation, a description of the event as described in a pertinent event specification. All recorded events are sent to a management system that collects and manages such information.

Based on the foregoing, it is believed that a need exists for an improved method and system for effectively identifying a systemic failure and a root cause of incidents. In particular, a need exists for understanding failures and root causes at two basic levels: (1) for a single incident; and (2) more importantly, across incidents. It is believed that analyzing across incidents is a crucial factor to identifying systemic failures and root causes. Otherwise, one will constantly be fixing problems isolated to individual incidents and the likelihood of successful corrective actions with desired long-term and far reading effects will be much lower.

Digital filtering and change of state edge detection of an input for sequence of events reporting when the voltage or current being monitored may incur interference from self-tests, contact bounce and other external influences. This also requires performance of hysteresis to ignore samples taken while the input signal is traveling between states. The goal is to apply a timestamp at which sample the transition actually occurs, while preventing false events being reported when the sample data is influenced by internal or external factors, and to avoid reporting a transition too early if the input is slow in transition.

SUMMARY OF THE INVENTION

A method and system are provided for digital input edge detection with smart filtering. More specifically, digital filtering and change of state edge detection of an input for sequence of events reporting is provided that ignores changes in signals received as the result of interference from self-tests, contact bounce and other external influences. Improved sequence of events analysis is provided that is better able to determine the primary cause of failure sequences. The digital filter is more flexible than a hardware filter in that the filter time constant can be configurable.

DETAILED DESCRIPTION OF THE INVENTION

Figure 1:
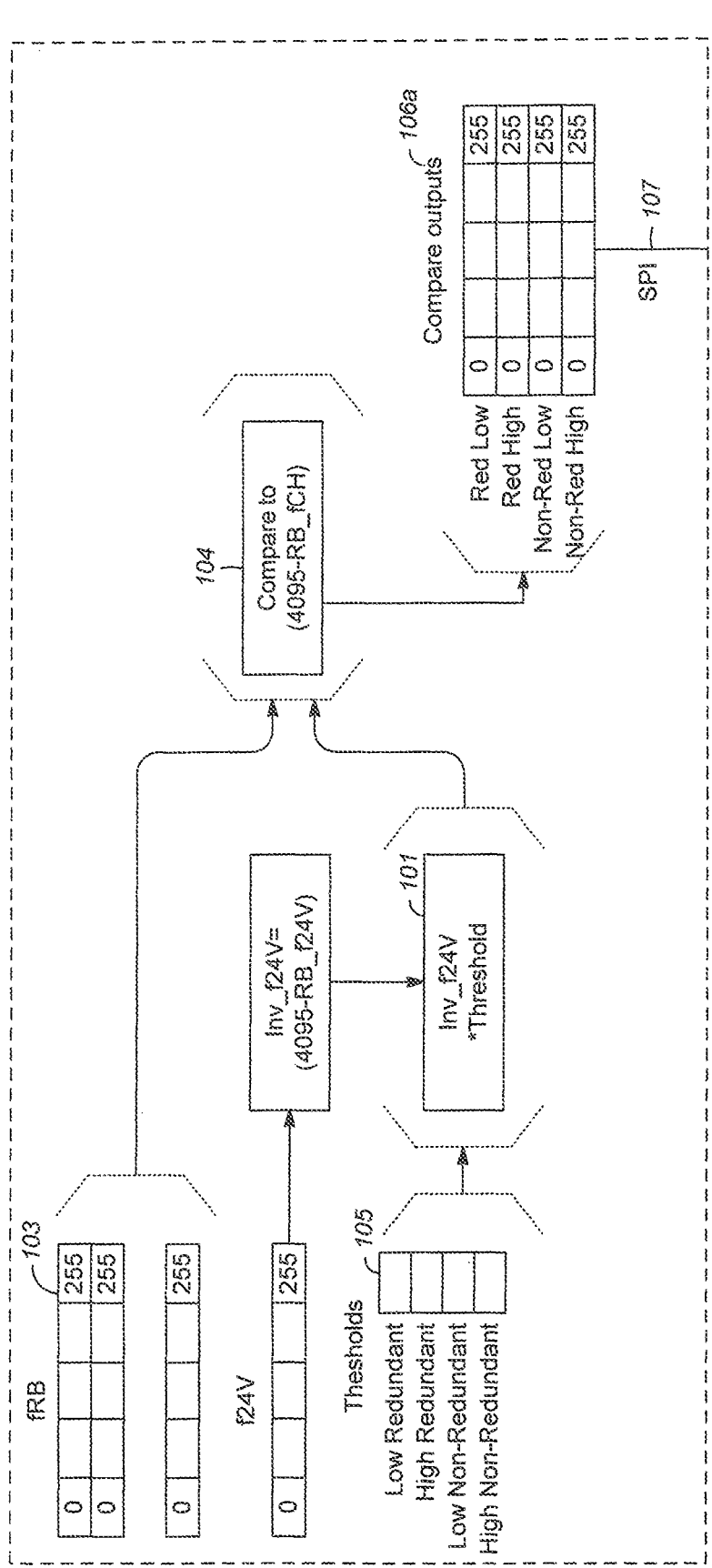
FIG. 1 shows an I/O board and a process board with the use of the digital filter to detect events.
Figure 1:
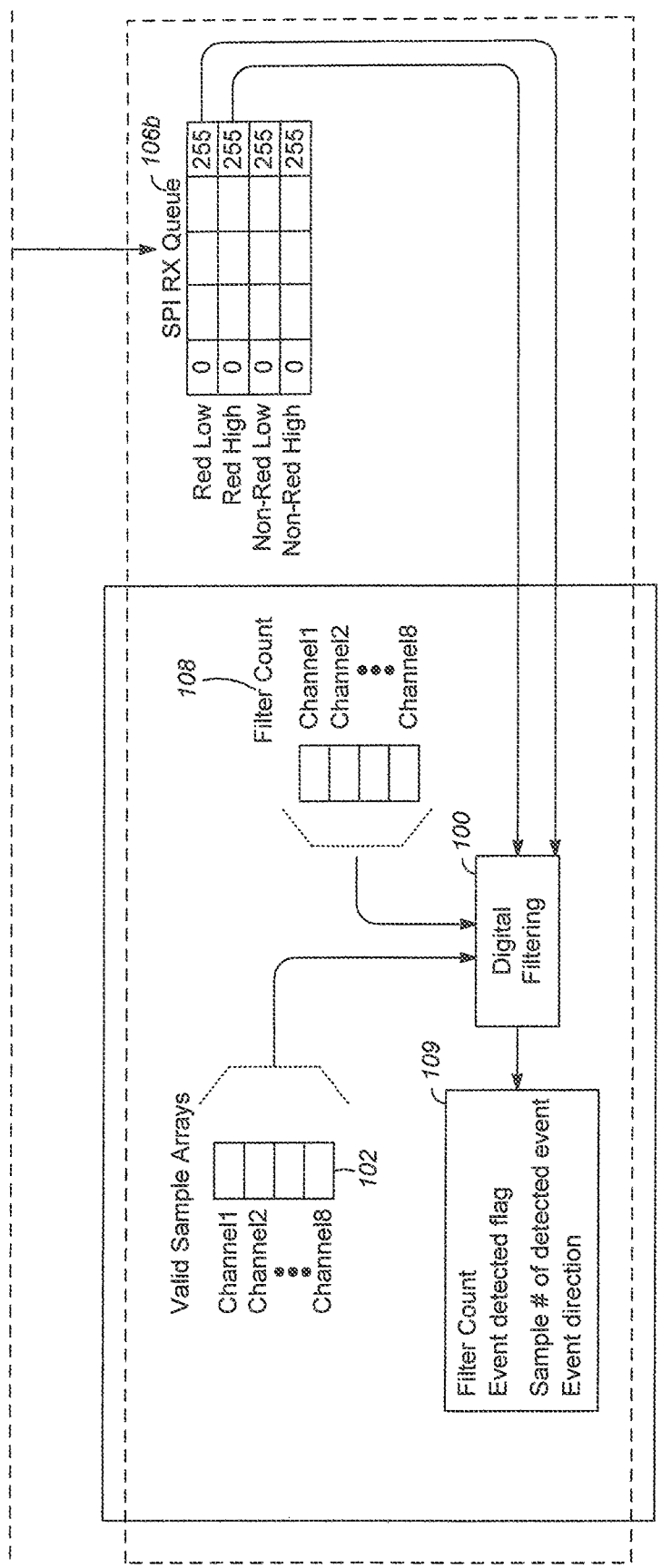

Sequence of events is used in many industries to identify failure sequences. In the event of a shutdown or malfunction, a potentially large number of data points are collected. These data points include input state changes with high resolution timestamps when the state change occurred. Engineers later review the logs to determine the primary cause for failure such as a bearing wobble, an upset of incoming power, a loss of A/C synchronization with the rest of the network, a loss of steam pressure, or steam temperature or other temperature changes. These primary causes of shutdown or malfunction can vary significantly depending upon the particular industry. Some of these causes require repairs to equipment and some external causes may even involve monetary damages from suppliers. Sequence of events detection and reporting is generally done by sampling at a high rate and analyzing input data for a "change of state" and, when detected, applying a high-resolution time stamp using a real-time clock source synchronized across all devices.

The current disclosure relates in particular to low latency sequence of events. In a system, there may be hundreds or thousands of channels that transmit information. In some systems such as an example system, there are 32 channels that are monitored continuously although as a practical matter the monitoring is occurring frequently (for example, every millisecond). Most importantly, the events are recorded in the order they occur. This can produce large amounts of data. When there is an incident, it is then possible to go back and analyze the sequence of events as well as pinpointing the exact time even down to the millisecond as to when an event occurred. This can allow the operator then to determine a root cause for an abnormal occurrence or just determine that operation went as normal.

In a typical system, there may be limitations on the capacity of the system to process data, such as limited speed on the processor or limited memory which makes it important to develop an efficient method of analyzing data. A 32 input/output module is being utilized in the disclosure described herein. About 40 to 64 of these modules are connected to a controller. The module does all of the sampling of the inputs and the edge detection. Then the sampling information is analyzed to determine the sequence of events.

In analyzing the events information, then it is important to monitor when an edge or a real change occurs. For example, a particular reading is "on" constantly and then switches to "off". It is necessary to determine whether this is a real change or just a one-time occurrence where it switched to "off" but then went back to its previous state immediately. In addition, there is continual testing occurring which needs to be distinguished from real situations that need to be recorded. It is therefore necessary to record real events and weed out the self-tests. In addition, there are situations that may incorporate a "bounce" in a signal. In some situations, there is not a clear "on" instant in time. Instead, there is a short-time fluctuation followed by a steady state operation. In monitoring these situations where there is a bounce or fluctuation, there needs to be a way to take into account this situation and to be able to ignore or filter out insignificant events. One needs to be able to ignore the bounce that occurs over a finite period of time. In addition, there are often self-tests that occur that should not be included in analyzing the sequence of events. Then it is the goal to be able to identify a singular event when a state change really occurred. The system that is monitoring each of the channels will be reading whether the signal is "on" or "off" or is it a "1" or is it a "0". This type of monitoring requires a minimum amount of processing capacity.

In this disclosure, one way that the signal is monitored is that a voltage is read that may be a gradual change or an instantaneous change. A given voltage may be read as an "on" at for example exceeding 5 volts or "off" when it passes below 1 volt. An "edge" is defined as the point in time when the voltage is above a designated voltage such as it exceeds the 5 volt threshold.

In a safety system, a device that carries out a safety function must maintain its safety integrity level which include continuous self-tests and diagnostics on its input circuitry. These self-tests may briefly influence the result of the input sensing and affect the sample data used for sequence of events reporting. To provide accurate sequencing of events while performing self-test to maintain safety integrity a reliable method is required for detecting state changes while filtering out invalid sample data including the self-test data.

Among the actions that may be taken in development of accurate sequencing of events is to perform filtering against external influences with discrete components. However, this can result in an invariable time constant, provides slower response times under all conditions, and is subject to component faults, tolerances or drift. One can stop the sequence of events data collection while a self-test is being performed. This would mean that a secondary method would still be required for managing detected but unplanned factors which affect the input, such as a loss of a redundant device. In addition to or instead of using the counting filter, this method could be integrated with a debounce counter. A debounce counter would start a counter when both comparator readings indicate the input has changed to the opposite state. Any time the value transitions across both comparator thresholds the counter would reset. When the counter reaches its target value a transition would be reported. In some cases, this may provide a more accurate timestamp of the leading edge of the transition. In other cases, an input with little filtering and significant contact bounce could take longer to resolve and be less accurate because the counter keeps resetting.

A better way has now been developed as shown in FIG. 1 in which there is a digital filter (100) and edge detector (101) that are augmented by integrating a method for excluding known invalid samples and a method for excluding samples taken while the input is in the traveling range. Technical benefits of the invention include the greater flexibility of a digital filter (100), which can be implemented in for example software or programmable logic, as compared to a hardware filter in that the filter time constant can be configurable. By taking an exclusion mask as an input to the filter, the engine that is collecting the input samples (102) continues to execute while the device performs self-tests and the filter can be fed a continuous stream of sample data. This method better approximates the start of the transition as compared to the prior art by keeping a history of samples taken before the exclusion range. The applicant of this invention is responsible for flagging the range of samples during which the self-test is performed and when the input value is known to be invalid.

The disclosure adds a low latency sequence of events reporting to a safety I/O module. The module periodically runs diagnostics which briefly influence the input value. This module supports up to 32-channels of digital inputs with low latency Sequence of Events (SOE) which introduces a CPU performance risk. One advantage of this filtering method is a reduction in the overhead on the CPU from managing the SOE state machine and allows it to focus on performing the safety functions.

A feature of the process is that it relies on a periodic conversion of a voltage for an input point. These samples (103) must be taken at a fixed frequency to provide a known time difference between data points. The sampled value (103) is compared (104) against two sets of configurable thresholds (105) to provide a set of high and low comparison results. For each sample a valid bit is maintained to indicate if the sample has been influenced by a self-test and should be excluded when fed into the filter (100).

The filtering algorithm as shown in FIG. 1 has a programmable filter time value to allow flexibility based on the application. The filter also takes an initial state and filter count to allow detection to start in either the high or low state. The filtering algorithm takes 16-bit words for each of the high and low comparison values (106a) (or 106b) if the sampling and filtering are implemented on different devices connected through a communication link (107). This communication link can be anything, in FIG. 1 a Serial Peripheral Interface (SPI) link is depicted) and a 16-bit exclusion mask. The filtering algorithm walks through each bit and performs the following: If the sample is valid and the input is detected to be high, then the filter count (108) increases. If the sample is valid and the input is detected to be low, then the filter count (108) decreases. If either the sample is marked as invalid or the state is neither high nor low, then the filter count (108) is unchanged. If the filter count (108) reaches the highest count and the previous state was low or if the filter count (108) reaches the lowest count and the previous state was high, then the filter (100) outputs an event result to indicate the new state and the bit number of the sample at which the transition completed (109). In order to allow the program to pause filtering and continue with mission critical functions, the filter always presents the current sample counter and last known state after processing each set of words (109). When time permits, and more physical sample data has been collected, the filter resumes by accepting this count and state as inputs.

The major differences between this disclosure and the prior art is the ability to exclude samples based on a string of valid/invalid samples with a 1 to 1 correlation to the input samples. This may include an exclusion mask that filters out samples such as those recorded when there is a "bounce" situation when the samples are showing a fluctuation that does even out into a steady state within a short period of time.

FIG. 1 shows a system of an I/O board and a processing board that produce and sample the signal. The top left (103) shows the sample with channel 1, channel 2 and then the last is channel 32 of the 32 channels. In this example, there are 255 samples for each channel, with each sample taken 0.256 ms apart. After the recording of bits is at a high level for a given number of bits, for example, after the 20th sample then it would be considered to be an event to be recorded. You continue to process through a bit array until there is a transition that the state has changed. This analysis continues on the I/O board until a transition is reached. In the lower left box, there is a digital filtering box (100) as well as a determination of valid sample arrays (102).

Figure 2:
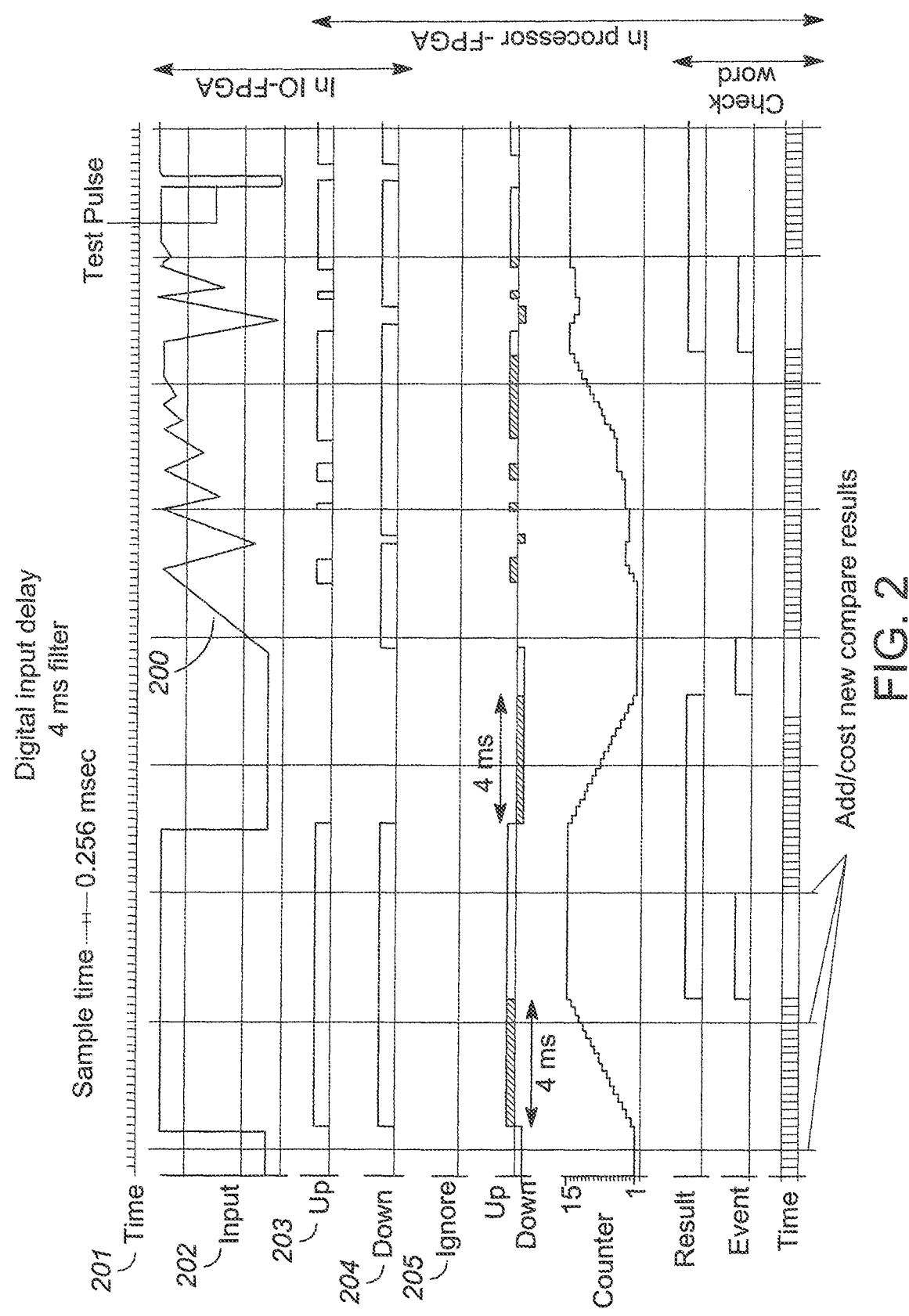
FIG. 2 shows the digital input over time to show the effect of implementation of the digital filter.

FIG. 2 shows a 4 ms filter digital input delay. In particular, it shows time intervals that would be disregarded as showing random events (200) or other data that is not indicative of an event that needs to be included in the sequence of events being recorded. Going from the top of the Figure, there is shown (201) the time sequence of every sample time of 0.256 msec. The next segment of FIG. 2 shows the combined input (202) over time with a prolonged plateau shown on the left portion and a number of irregular fluctuations of the input signal shown on the right including a test pulse on the far right. The next two segments show the accumulated time (203) when the input signal was at or above a high comparison state or a low comparison state (204). Then there is a segment (205) that shows the portion of the time line that is being ignored because of the test pulse.

Specific Embodiments

While the following is described in conjunction with specific embodiments, it will be understood that this description is intended to illustrate and not limit the scope of the preceding description and the appended claims.

A first embodiment of the invention is a method for detecting and subsequently recognizing abnormal events in a process, the method comprising the steps of obtaining a plurality of samples (103) at a fixed frequency of sampling to provide a known time difference between process data points; sending the plurality of samples (103) to a digital filter (100); using the digital filter (100) to compare each of the samples against two sets of configurable thresholds (105) wherein the two sets of configurable thresholds are different to provide a set of high and low comparison results; determining a relation of each of the samples in comparison (104) to the configurable thresholds; determining whether each of the plurality of samples is repeated; counting a number of valid samples to be counted as a filter count (108); and recording an event (109) when a filter count (108) reaches a pre-specified level. An embodiment of the invention is one, any or all of prior embodiments in this paragraph up through the first embodiment in this paragraph further comprising determining whether each sample is valid or invalid. An embodiment of the invention is one, any or all of prior embodiments in this paragraph up through the first embodiment in this paragraph wherein discarding the invalid sample after it is determined to be invalid. An embodiment of the invention is one, any or all of prior embodiments in this paragraph up through the first embodiment in this paragraph wherein the sample is determined to be invalid based upon observation of a fluctuating sample value followed by a steady sample value. An embodiment of the invention is one, any or all of prior embodiments in this paragraph up through the first embodiment in this paragraph wherein the sample is determined to be invalid based upon An embodiment of the invention is one, any or all of prior embodiments in this paragraph up through the first embodiment in this paragraph wherein the filter count (108) comprises a predetermined value defined as constituting an event to be recorded. An embodiment of the invention is one, any or all of prior embodiments in this paragraph up through the first embodiment in this paragraph wherein the filter count (108) is decreased when the process data point is within two sets of configurable thresholds. An embodiment of the invention is one, any or all of prior embodiments in this paragraph up through the first embodiment in this paragraph wherein the digital filter (100) takes an initial state and filter count (108). An embodiment of the invention is one, any or all of prior embodiments in this paragraph up through the first embodiment in this paragraph wherein the event is recorded in an event collector stored in memory on a processor (109). An embodiment of the invention is one, any or all of prior embodiments in this paragraph up through the first embodiment in this paragraph wherein the determination of the relation is that the plurality of process data points is higher than an upper configurable threshold. An embodiment of the invention is one, any or all of prior embodiments in this paragraph up through the first embodiment in this paragraph wherein the determination of the relation is that the plurality of process data points is lower than a lower configurable threshold.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A method for detecting and subsequently recognizing abnormal events in a process, said method comprising the steps of:
    obtaining a plurality of samples (103) at a fixed frequency of sampling to provide a known time difference between process data points;
    sending said plurality of samples (103) to a digital filter (100);
    using said digital filter (100) to compare each of said samples against two sets of configurable thresholds (105) wherein said two sets of configurable thresholds are different to provide a set of high and low comparison results;
    determining a relation of each of said samples in comparison (104) to said configurable thresholds;
    determining whether each of said plurality of samples is repeated;
    determining whether each of said plurality of samples is valid or invalid;
    counting a number of the valid samples to be counted as a filter count (108), wherein said filter count increases based on said determined valid sample and high comparison result and said filter count decreases based on said determined valid sample and low comparison result; and
    recording an event (109) when a filter count (108) reaches a pre-specified level.

2. The method of claim 1 wherein discarding said sample after it is determined to be invalid.

3. The method of claim 2 wherein said sample is determined to be invalid based upon observation of a fluctuating sample value followed by a steady sample value.

4. The method of claim 2 wherein said sample is determined to be invalid based upon a string of samples with a 1 to 1 correlation to input samples.

5. The method of claim 1 wherein said filter count (108) comprises a predetermined value defined as constituting an event to be recorded.

6. The method of claim 1 wherein said filter count (108) is decreased when said process data point is below the lower threshold.

7. The method of claim 1 wherein said digital filter (100) takes an initial state and filter count (108).

8. The method of claim 1 wherein said event is recorded in an event collector stored in memory on a processor (109).

9. The method of claim 1 wherein said determination of said relation is that said process data points is higher than an upper configurable threshold or lower than a lower configurable threshold.

10. The method of claim 1 further comprising the steps of:
    inputting an exclusion mask to said digital filter, for receiving said plurality of samples,
    wherein said plurality of samples is received while a device performs self-tests.

11. The method of claim 10 further comprising the steps of:
    excluding said plurality of samples while said input is in a range associated with said self-tests.

* * * * *